United States Patent [19]

Aoshima et al.

[11] Patent Number: 5,025,142
[45] Date of Patent: Jun. 18, 1991

[54] LIGHT WAVEFORM CHANGING APPARATUS USING AN OPTICAL AMPLIFIER

[75] Inventors: Shinichiro Aoshima; Tsuneyuki Urakami; Yutaka Tsuchiya, all of Shizuoka, Japan

[73] Assignee: Hamamatsu Photonics Kabushiki Kaisha, Shizuko, Japan

[21] Appl. No.: 353,948

[22] Filed: May 19, 1989

[30] Foreign Application Priority Data

May 26, 1988 [JP] Japan .................................. 63-129193

[51] Int. Cl.$^5$ ............................................. H01J 40/00
[52] U.S. Cl. ........................... 250/201.9; 330/4.3
[58] Field of Search ..................... 250/201.9, 227.11; 330/4.3; 455/610

[56] References Cited

U.S. PATENT DOCUMENTS

| 3,887,876 | 6/1975 | Zeidler | 330/4.3 |
|---|---|---|---|
| 4,053,763 | 10/1977 | Harney | 330/4.3 |
| 4,310,217 | 1/1982 | de Mendez et al. | 350/96.16 |
| 4,329,664 | 5/1982 | Javan | 330/4.3 |
| 4,511,850 | 4/1985 | Schlitt et al. | 330/4.3 |
| 4,847,477 | 7/1989 | Smith | 250/201.9 |

FOREIGN PATENT DOCUMENTS

| 0014634 | 8/1980 | European Pat. Off. . |
|---|---|---|
| 0027758 | 4/1981 | European Pat. Off. . |
| 0139081 | 5/1985 | European Pat. Off. . |

*Primary Examiner*—David C. Nelms
*Assistant Examiner*—Stephone B. Allen
*Attorney, Agent, or Firm*—Finnegan, Henderson, Farabow, Garrett & Dunner

[57] ABSTRACT

A light waveform shaping apparatus comprises; a beam splitting means for branching an input optical signal into two optical signals; a photoelectric converter for converting one of the two branched optical signals into an electrical signal; an optical amplifier whose gain is adjustable by a controlling electrical signal, for amplifying an optical signal; an input optical path for introducing the other branched optical signal to the optical amplifier; and an electrical circuit for introducing the electrical signal from the photoelectric converter to the optical amplifier; wherein the optical and controlling electrical signals are supplied to the optical amplifier at a predetermined timing of generally coincident arrival.

23 Claims, 8 Drawing Sheets

LIGHT WAVEFORM CHANGING APPARATUS USING AN OPTICAL AMPLIFIER

BACKGROUND OF THE INVENTION

The present invention relates to a light waveform changing apparatus and, more particularly, to a novel light waveform changing apparatus that is suitable for use in optical communications using optical fibers and which is capable of shaping the waveform of an optical signal at high speed without employing an electro-optical converter.

One of the problems encountered in optical communications, in particular, those using optical fibers is that the waveform of a pulse signal being transmitted over a long distance becomes less sharp on due to various factors including wavelength dispersion in optical fibers. In addition, the intensity of a pulse will decrease due to light attenuation. In order to deal with this situation, repeaters must be installed every predetermined distance over the transmission path so that the blunt and attenuated pulse signal is reshaped and amplified into a pulse waveform having sharp leading and trailing edges.

Figure 22:
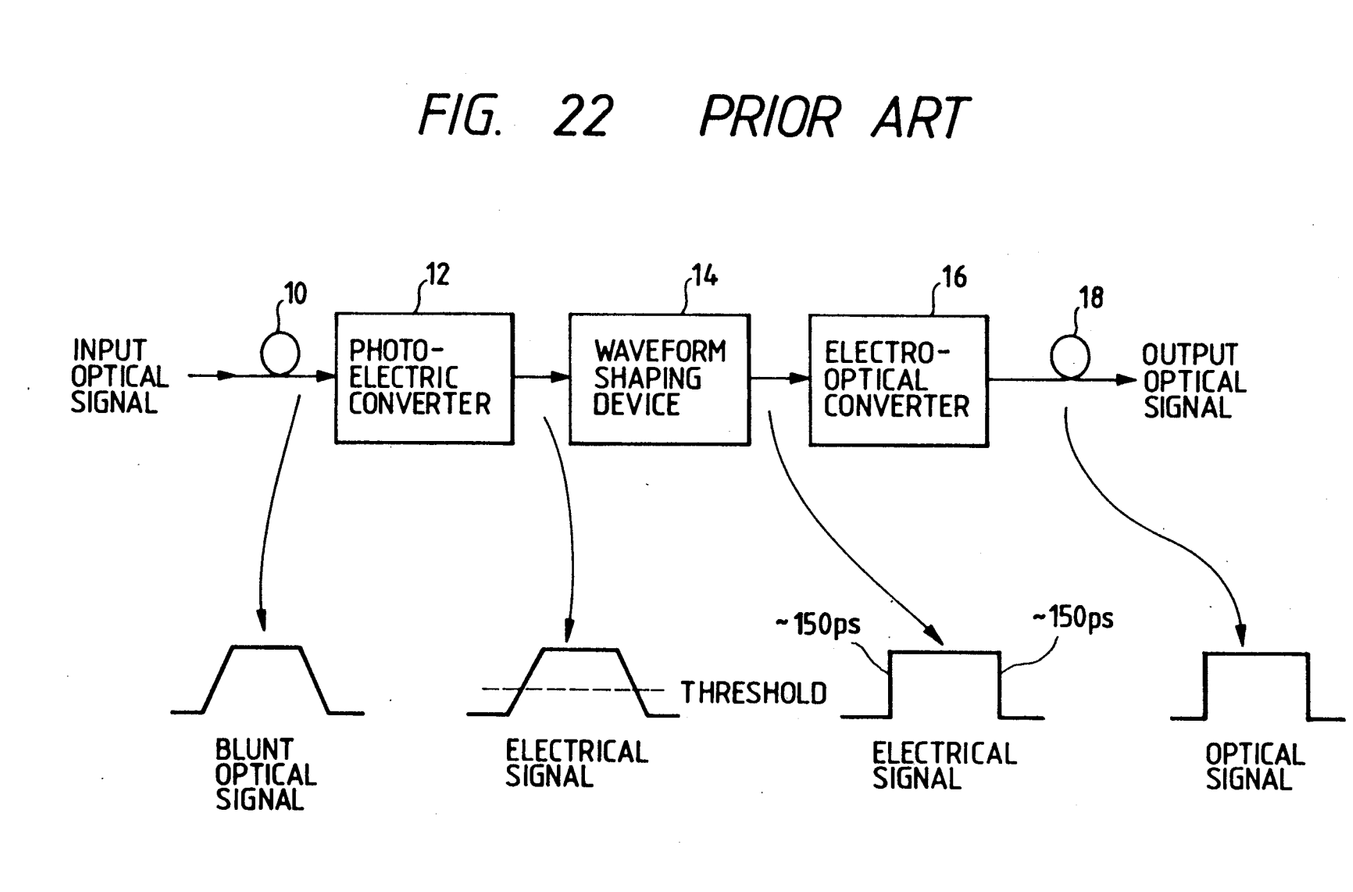
FIG. 22 is a block diagram showing the composition and operation of a conventional light waveform shaping apparatus.

A conventional light waveform shaping apparatus that has been used for this purpose typically has the composition shown in FIG. 22. In this apparatus, an optical signal having a blunt waveform that is launched from an optical fiber 10 is first supplied to a photoelectric converter 12 where it is converted into a electrical signal. The output of the converter 12 is then supplied to a waveform shaping device 14 (e.g. an emitter-coupled logic circuit (ECL), which is a typical high-speed logic circuit) where the waveform is shaped electrically using a predetermined threshold level. Subsequently, the shaped electrical signal is supplied to an electro-optical converter 16 (e.g. a semiconductor laser or LED) where it is restored to an optical signal to be inputted to an optical fiber 18.

The conventional light waveform shaping apparatus described above needs to perform not only photoelectric conversion but also electro-optical conversion, so it is susceptible to waveform distortion and deterioration in response speed during the electro-optical conversion. A further problem with this apparatus is that even if a high-speed ECL is used as the light waveform shaping device 14, each of the rise and fall times of a pulse signal cannot be made shorter than the order of 150 picoseconds. A large signal delay time is another problem. Furthermore, there occurs a coupling loss between the electro-optical converter 16 and the optical fiber 10. Besides these problems, the conventional apparatus requires a power to be supplied to each of the photoelectric converter 12, waveform shaping device 14 and the electro-optical converter 16, resulting in increased power consumption.

SUMMARY OF THE INVENTION

An object, therefore, of the present invention is to provide a light waveform changing apparatus that is free from the aforementioned problems of the prior art and which is capable of direct shaping of the waveform of an optical signal with a simplified configuration that does not include any electro-optical converter.

This object of the present invention can be attained by a light waveform changing apparatus which generally comprises a beam splitting means that branches an input optical signal to be shaped into two signals, a photoelectric converter that converts one of the two branched optical signals into an electrical signal, an optical amplifier that amplifies an optical signal and whose gain is adjustable by an electrical signal, an input optical path through which the other branched optical signal is supplied to said optical amplifier, and an electrical circuit that supplies the output electrical signal from said photoelectric converter to said optical amplifier at a predetermined timing which is generally the same as the time of arrival of the optical signal. With this apparatus, the object of the present invention is attained by shaping the waveform of the input optical signal through modulation with the electrical signal.

In a preferred embodiment, said optical amplifier is supplied with a bias current in combination with the output signal from said photoelectric converter.

In another preferred embodiment, a current amplifier for amplifying the output signal from said photoelectric converter is inserted in said electrical circuit.

In still another preferred embodiment, said optical amplifier is designed as a traveling-wave type optical amplifier having an anti-reflection coating formed on both end faces of a semiconductor laser.

In a further preferred embodiment, a delay unit that provides a relative quantity of delay between the optical and electrical signals to be supplied to said optical amplifier is inserted so as to produce an optical output having a desired waveform.

In a still further embodiment, said quantity of delay is made variable.

In another preferred embodiment, a plurality of stages of the light waveform shaping apparatus described above are connected in series.

Other and further objects, features and advantages of the invention will appear move fully from the following description taken in connection with the accompanying drawings.

DETAILED DESCRIPTION OF THE PREFERRED EMBODIMENTS

Figure 1:
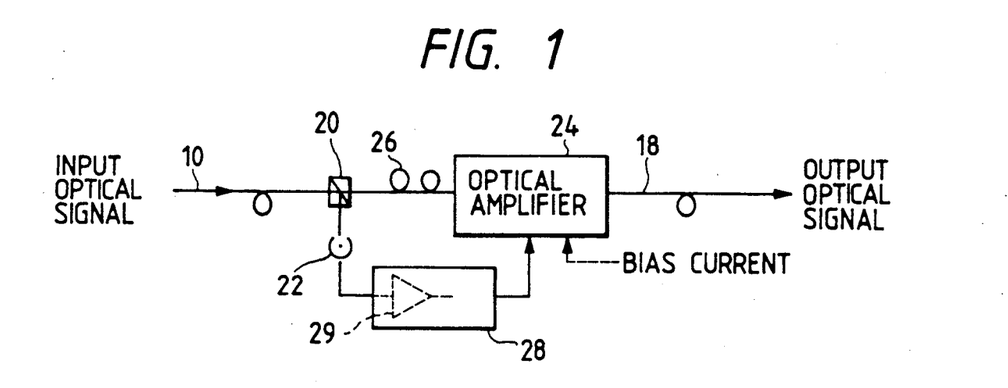
FIG. 1 is a block diagram showing the basic composition of the apparatus of the present invention.

In the apparatus of the present invention, an optical signal whose waveform is to be shaped and which is supplied through, for example, an optical fiber 10 is branched into two signals with a beam splitting means 20. One of the branched optical signals are converted into an electrical signal in a photoelectric converter 22 and thence supplied to an electrical circuit 28. The other branched signal is directly fed to an input optical path 26. The optical signal and electrical signal are thereafter supplied to an optical amplifier 24 that amplifies an optical signal and whose gain is adjustable by an electrical signal. The timing of optical and electrical signals to be fed to the optical amplifier 24 is so adjusted that they will arrive there generally simultaneously. By modulating the optical signal with the electrical signal in the optical amplifier 24, the waveform of the input optical signal is shaped and subsequently sent to, for example, an optical fiber 18. As a result, the waveform of the input optical signal can be directly shaped with a simplified composition without using an electro-optical converter, and this permits high-speed response because of the absence of any waveform distortion or deterioration in response speed, which would otherwise occur in the presence of an electro-optical converter. In addition, the apparatus of the present invention is free from a coupling loss that would otherwise occur between an electro-optical converter and an optical fiber. The elimination of an electro-optical converter offers the additional advantage of reduced power consumption.

Examples of the beam splitter 20 that can be used in the present invention include a fiber beam splitter, a cubic beam splitter, a half mirror, etc.

Examples of the photoelectric converter 22 that can be used in the present invention include solid-state devices such as a PIN photodiode, and a photomultiplier tube.

As shown by dashed lines in FIG. 1, a bias current may be applied to the optical amplifier 24 and/or a current amplifier 29 that amplifies the output signal from the photoelectric converter 22 may be inserted in the electrical circuit 28. In these cases, an output optical signal that is more intense than the input optical signal can be obtained even if the photoelectric converter 22 has less than 100% efficiency of photoelectric conversion. If a device such as a photomultiplier tube which itself has an amplifying function is used as the photoelectric converter 22, it is not always necessary to apply the bias current or to insert the current amplifier 29.

The optical amplifier 24 that is capable of producing an optical output by amplifying input light by a factor that is dependent on an external electrical signal is available in various types including: a non-resonant traveling-wave type optical amplifier (TWA) which has an anti-reflection film coated on both end faces of a semiconductor laser to suppress reflection from those faces; a Fabry-Perot type optical amplifier (FPA) which uses a conventional semiconductor laser as an optical amplifier with it being biased below the threshold level for oscillation; an optical fiber Raman amplifier which utilizes Raman scattering induced in an optical fiber; an amplifier using a DFB laser; and an injection synchronous amplifier. Semiconductor amplifiers are advantageous because of their compactness and ease of control in operation.

Among semiconductor optical amplifiers, TWA and FPA are particularly advantageous. TWA has fast response to electrical signals and is capable of amplification of high speed optical signals. Because of the absence of resonator-dependent selectivity for wavelength, TWA has a broad (ca. 50 nm) wavelength range for gain and assures consistency in gain in the face of variations in the temperature of the amplifier or in the wavelength of incident light. TWA is also superior in terms of gain saturation and noise characteristic which are two important characteristics of an optical amplifier. On the other hand, FPA is easy to fabricate and allows a high gain to be attained in the neighborhood of a threshold value even with low current injection because it utilizes multiple reflections between both end faces to produce signal gain.

Another advantage of the semiconductor optical amplifiers is that their gain can be easily adjusted by changing the amount of injection current, so they can also be used as an optical switch by turning on or off the injection of current.

Figure 2:
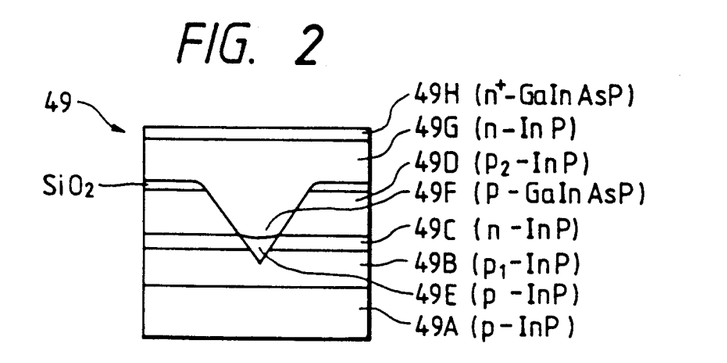
FIG. 2 is a cross section showing an illustrative composition of a semiconductor laser which is the main component of a traveling-wave type optical amplifier (TWA) used as an example of an optical amplifier in the apparatus of the present invention.

A TWA that is suitable for use in the present invention has an anti-reflection film coated on both end faces of a semiconductor laser 49 of the VIPS (V-grooved inner stripe on p-substrate) structure shown in FIG. 2, which may be formed by the following steps: in the first cycle of liquid-phase growth, a $p_1$-InP buffer layer 49B, n-InP block layer 49C and $p_2$-InP block layer 49D are grown on a p-InP substrate 49A; thereafter a V-shaped groove having a (111)B face is formed in 49B, 49C and 49D by wet etching, with a $SiO_2$ stripe mask being prepared by a conventional photolithographic process; and in the second cycle of liquid-phase growth, a p-InP cladding layer 49E, a p-type or undoped GaInAsP active layer 49F, n-InP cladding layer 49G and $n^+$-GaInAsP contact layer 49H are grown successively. The GaInAsP active layer 49F is formed at the bottom of the V-shaped groove, with its width and thickness being controlled to ca. 1.2 $\mu$m and 0.10 $\mu$m, respectively. Thereafter, electrodes are formed and end faces are created by cleavage. An anti-reflection film is then deposited onto both end faces of the resulting semiconductor laser 49 using a material such as $SiO_2$ so as to fabricate a TWA. The semiconductor laser 49 of the VIPS structure has a sufficiently high efficiency of injection into the active layer to produce superior high output characteristics, so the TWA using this semiconductor laser also produces high gain and highly saturated output.

Figure 3:
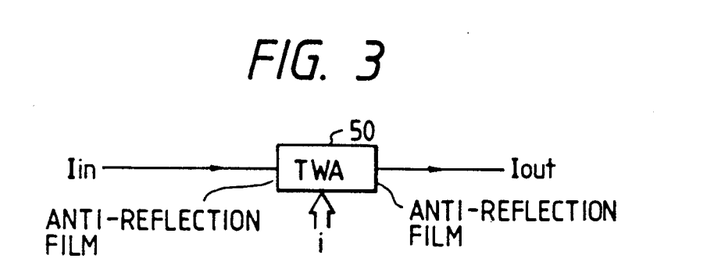
FIG. 3 is a diagram illustrating the operating characteristics of the TWA.
Figure 4:
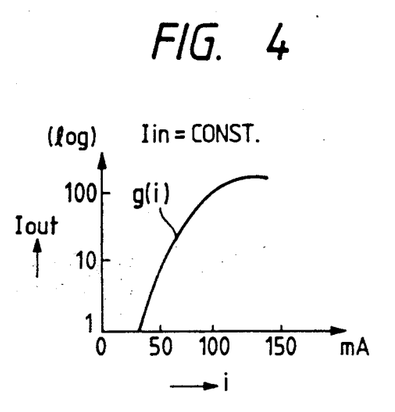
FIGS. 4 and 5 are diagrams illustrating the intensity characteristics of output light from the TWA.
Figure 5:
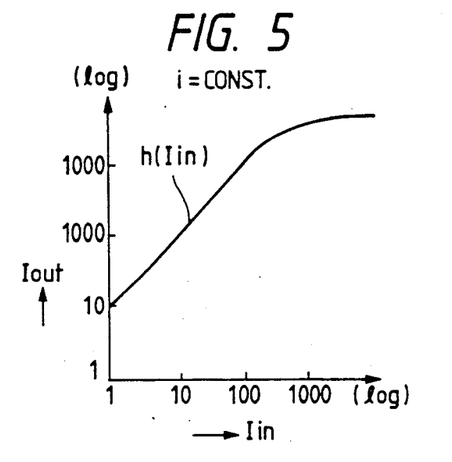

The TWA 50 thus fabricated has a basic composition as shown in FIG. 3. When the intensity of input light $I_{in}$ being launched into the TWA 50 is constant, the intensity of output light $I_{out}$ from the TWA 50 will change nonlinearly as shown in FIG. 4 in response to the change in input current i. If the value of input current i to the TWA 50 is constant, $I_{out}$ will change also nonlinearly as shown in FIG. 5 in response to the change in $I_{in}$. It can therefore be seen that when $I_{in}$ is constant, $I_{out}$ can be controlled by i, whereas $I_{out}$ can be controlled by $I_{in}$ when current i is constant.

Figure 6:
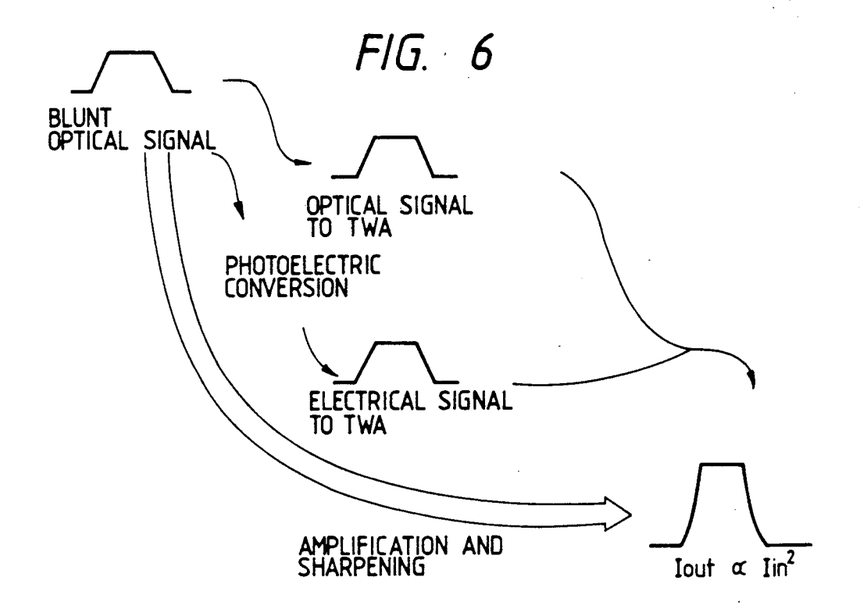
FIG. 6 is a diagram illustrating the operation of the apparatus of the present invention.

The operation of the TWA 50 as the optical amplifier 24 is shown in FIG. 6. When an input optical signal is modulated with an electrical signal that has been obtained by photoelectric conversion of said input optical signal (i.e., when the operating point satisfying the relation $\partial I_{out} / \partial i = 1$ is used), nonlinear amplification is achieved in which the intensity Of Output light, $I_{out}$, is proportional to the square of the intensity of input light, $I_{in}$. In addition to this amplification of input light intensity, the rise and fall times of light waveform can be shortened to the order of the response times of the photoelectric converter 22 and TWA 50 (50–100 picoseconds). Even faster rising and falling can be accomplished by using the operating point that satisfies the relation $\partial I_{out} / \partial i > 1$.

Figure 7:
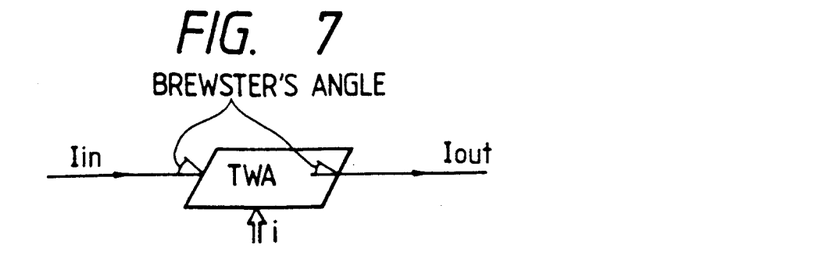
FIG. 7 is a schematic drawing of a modified version of the TWA.

In the TWA 50, reflection from both end faces is suppressed by the anti-reflection film coated thereon. It should, however, be noted that the anti-reflection film is not the sole mechanism for suppressing reflection from both end faces of the semiconductor laser and the same results can be attained by cutting each of the end faces at an angle equal to the Brewster's angle as shown in FIG. 7. In this case, the plane of polarization is restricted but this fact may be an advantage rather than a disadvantage when a need arises for restricting the plane of polarization because this need can be met without employing any polarizer or analyzer.

Figure 8:
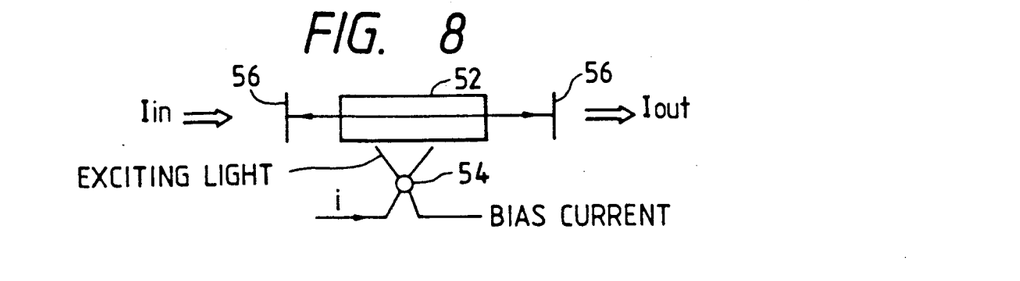
FIGS. 8-11 are schematic drawings showing other modifications of the optical amplifier used in the apparatus of the present invention.
Figure 9:
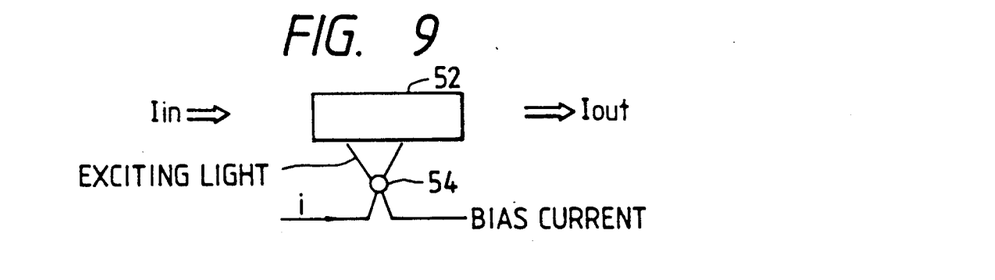

Besides the TWA 50 and FPA described above, other types of optical amplifiers 24 can be used in the present invention, including the resonant optical amplifier shown in FIG. 8 which is biased to a level below the threshold for oscillation by imparting excitation light to a solid laser medium 52 with a laser diode 54, and the non-resonant optical amplifier shown in FIG. 9 that is similar to TWA in which reflection from both end faces of the solid laser medium 52 is suppressed by providing an anti-reflection film or adjusting the angle of each end face to be equal to the Brewster's angle. In FIG. 8, the numeral 56 designates a resonant mirror. The laser diode 54 may or may not be supplied with a bias current for attaining a value in the neighborhood of the threshold level.

Figure 10:
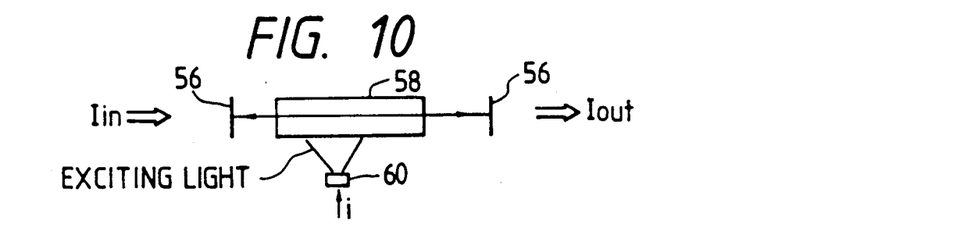

Another type of optical amplifier 24 that can be used in the present invention is shown in FIG. 10, in which a dye or gas laser medium 58 is excited with light from a semiconductor laser, light-emitting diode or a current controlled lamp 60. Resonant mirrors 56 may be omitted from the system shown in FIG. 10.

Figure 11:
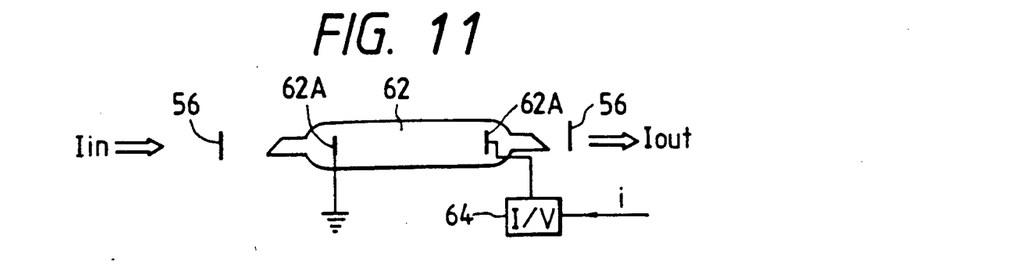

Still another type of optical amplifier 24 that can be used in the present invention is shown in FIG. 11, in which a gas laser medium 62 is excited by discharge, or the voltage applied between electrodes 62A from a current to voltage converter 64. Resonant mirrors 56 may be omitted from the system shown in FIG. 11.

The optical paths in the system may be composed of optical fibers and this has the advantage of increasing the degree of freedom in the layout of constituent elements, which enables not only simplified adjustments but also a reduction in the size of the overall system.

In another preferred embodiment, a delay unit that provides a relative quantity of delay between the optical and electrical signals to be supplied into the optical amplifier 24 may be inserted. In this case, by properly selecting the quantity of delay, an optical output having a desired waveform (i.e., a desired rise time, fall time and pulse width) can be obtained.

The quantity of the delay may be rendered continuously or discretely variable. In either case, the waveform of an optical output can be changed into a desired shape.

An electrical waveform shaping circuit that shapes the waveform of an electrical signal may be inserted into the electrical circuit and this is effective in producing a light waveform that has even more abrupt leading and trailing edges.

In still another embodiment of the present invention, a plurality of stages of the light waveform shaping apparatus described above are connected in series and this tandem arrangement contributes to a further enhancement in the amplification factor and the steepness of an output waveform.

Specific embodiments of the present invention are described below in greater detail with reference to the accompanying drawings.

A first embodiment of the present invention is generally a light waveform shaping apparatus which comprises a beam splitting means 20, a photoelectric converter 22, an optical amplifier 24, an input optical path 26 and an electrical circuit 28. This embodiment is shown more specifically in FIG. 12; the beam splitting means 20 is designed as a fiber beam splitter 70 which is directly connectable to a communications optical fiber 10; the TWA 50 is used as the optical amplifier 24; and an optical fiber designated 72 is also used as the input optical path 26 which connects the fiber beam splitter 70 to the TWA 50. The electrical circuit 28 which connects the photoelectric converter 22 to the TWA 50 is solely composed of a signal line 74.

Figure 12:
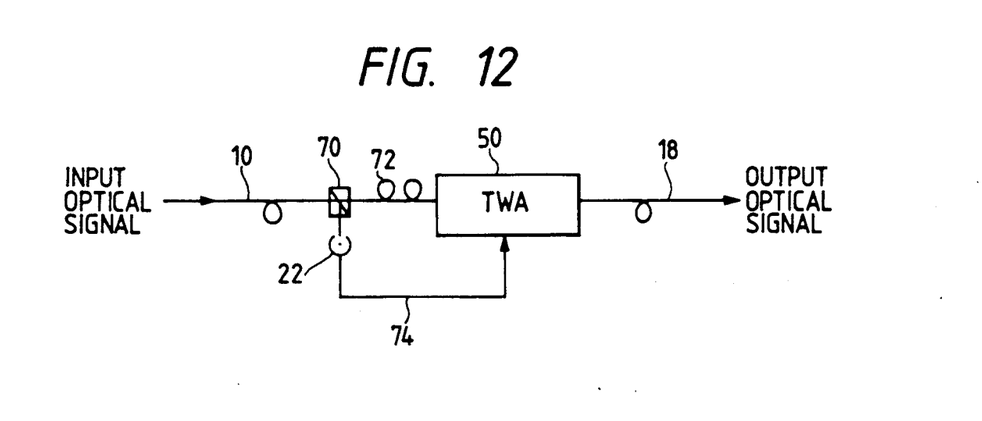
FIG. 12 is a block diagram showing the composition of a light waveform shaping apparatus according to a first embodiment of the present invention.

In accordance with this first embodiment, the rise an fall times of an output waveform can be shortened to the order of the response times of the photoelectric converter 22 and the TWA 50 (i.e., 50–100 picoseconds).

If desired, a current amplifier 29 (FIG. 1) may be inserted between the photoelectric converter 22 and the TWA 50 in order to enhance the amplification factor.

Figure 13:
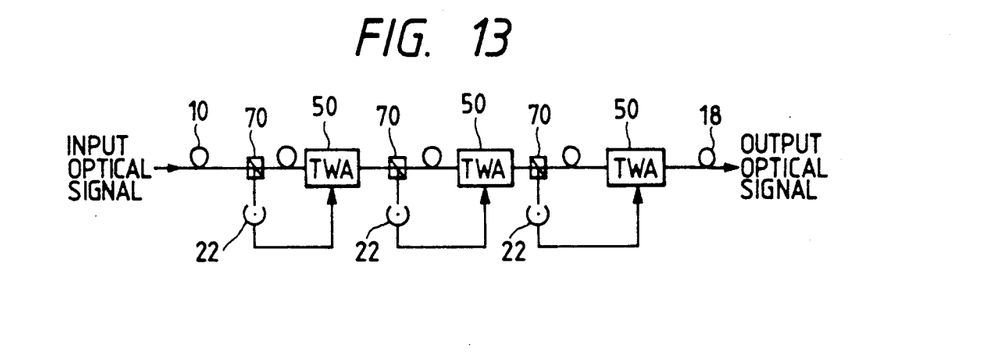
FIG. 13 is a block diagram showing the composition of a light waveform shaping apparatus according to a second embodiment of the present invention.

A second embodiment of the present invention is now described in greater detail with reference to FIG. 13. In this embodiment, a plurality of stages of such light waveform shaping apparatus as the first embodiment are connected in series, with care being taken to avoid the saturation of TWA 50. If, in this embodiment, the rise time of an output waveform from each stage of light waveform shaping apparatus is reduced by one half the rise time of an input waveform, the rise time of a final output waveform from the third stage can be reduced to one eighth of the rise time of an input waveform. The amplification factor can be raised to the third power by connecting three stages of light waveform shaping apparatus in series.

As in the first embodiment, a current amplifier 29 (FIG. 1) may be inserted between the photoelectric converter 22 and TWA 50 in each stage so as to enhance the amplification factor. Contrary to this, an ND filter or some other suitable device may be inserted between adjacent TWAs 50 in order to attenuate light so that TWAs will not be saturated.

Figure 14:
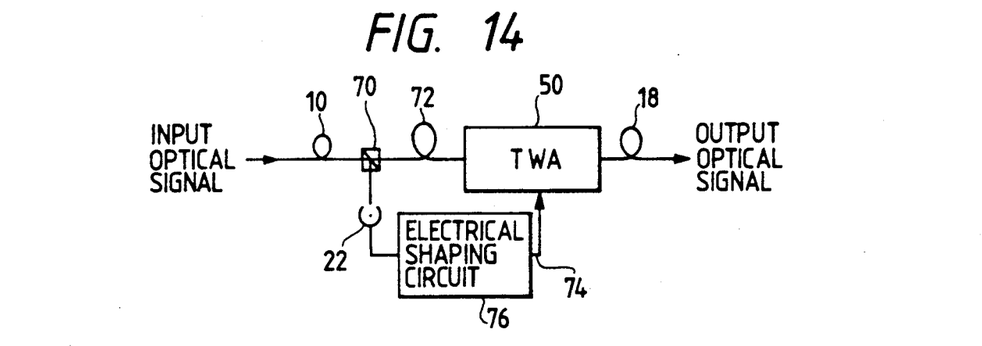
FIG. 14 is a block diagram showing the composition of a light waveform shaping apparatus according to a third embodiment of the present invention.

A third embodiment of the present invention is described below in greater detail with reference to FIG. 14. This embodiment is essentially the same as the first embodiment, except that an electrical waveform shaping circuit 76 is inserted in the signal line 74 serving as the electrical circuit 28. This waveform shaping circuit 76 reduces the rise and fall times of an electrical signal, thereby contributing to the production of an output light waveform having even sharper leading and trailing edges. If desired, a current amplifier 29 (FIG. 1) may be inserted between the waveform shaping circuit 76 and TWA 50 in order to enhance the amplification factor.

Figure 15:
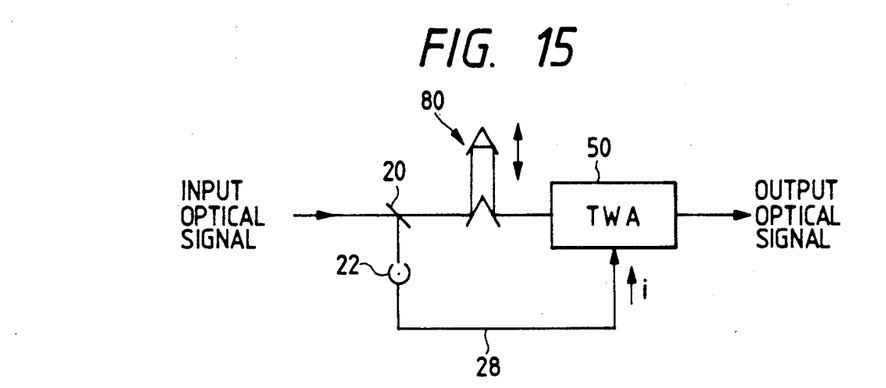
FIG. 15 is a block diagram showing the composition of a light waveform shaping apparatus according to a fourth embodiment of the present invention.
Figure 16:
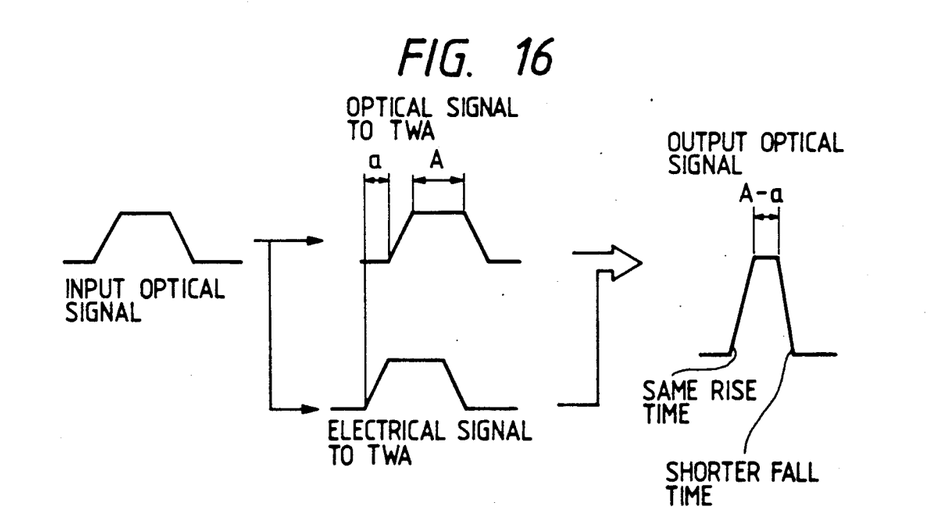
FIG. 16 is a diagram illustrating the operation of the apparatus according to the fourth embodiment.

A fourth embodiment of the present invention is now described in greater detail with reference to FIG. 15. This embodiment is generally a light waveform shaping apparatus which comprises a beam splitting means 20, a photoelectric converter 22, an optical amplifier 24, an input optical path 26 and an electrical circuit 28. More specifically, the optical amplifier 24 is designed as the TWA 50 and an optical delay unit 80 is inserted in the input optical path 26 so that an optical signal will be supplied to the optical amplifier 24 later than an electrical signal by a preset time lag a. If the supply of an input optical signal is delayed in the way described above, the fall time of an output waveform can be shortened as shown in FIG. 16 although its rise time remains the same as that of the input waveform. In this case, the duration of time for which an optical signal lasts is shortened by the delay time and hence, the pulse width can be controlled.

Ensuring the above-described delayed supply of an input optical signal, a current amplifier 29 (FIG. 1) may be inserted between the photoelectric converter 22 and the TWA 50.

Figure 17:
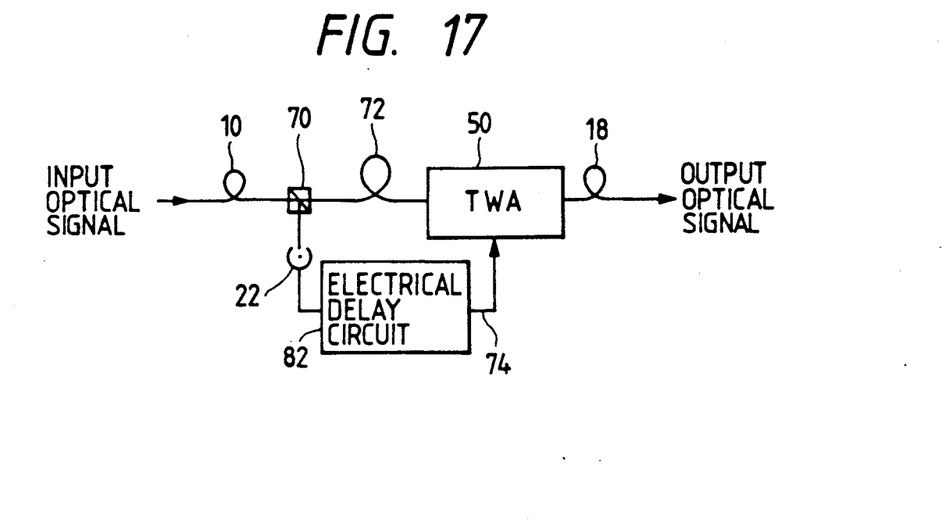
FIG. 17 is a block diagram showing the composition of a light waveform shaping apparatus according to a fifth embodiment of the present invention.

A fifth embodiment of the present invention is now described in greater detail with reference to FIG. 17. This embodiment is essentially the same as the first embodiment, except that an electrical delay circuit 82 is inserted in the signal line 74 serving as the electrical circuit 28. By delaying an electrical signal as compared to an optical signal, the rise time of an output waveform can be selectively shortened rather than its fall time which is shortened in the fourth embodiment. In this case, too, the duration of time for which an optical signal lasts is shortened by the delay time. If desired, a current amplifier 29 (FIG. 1) may be inserted between the delay circuit 82 and the TWA 50 so as to enhance the amplification factor.

Figure 18:
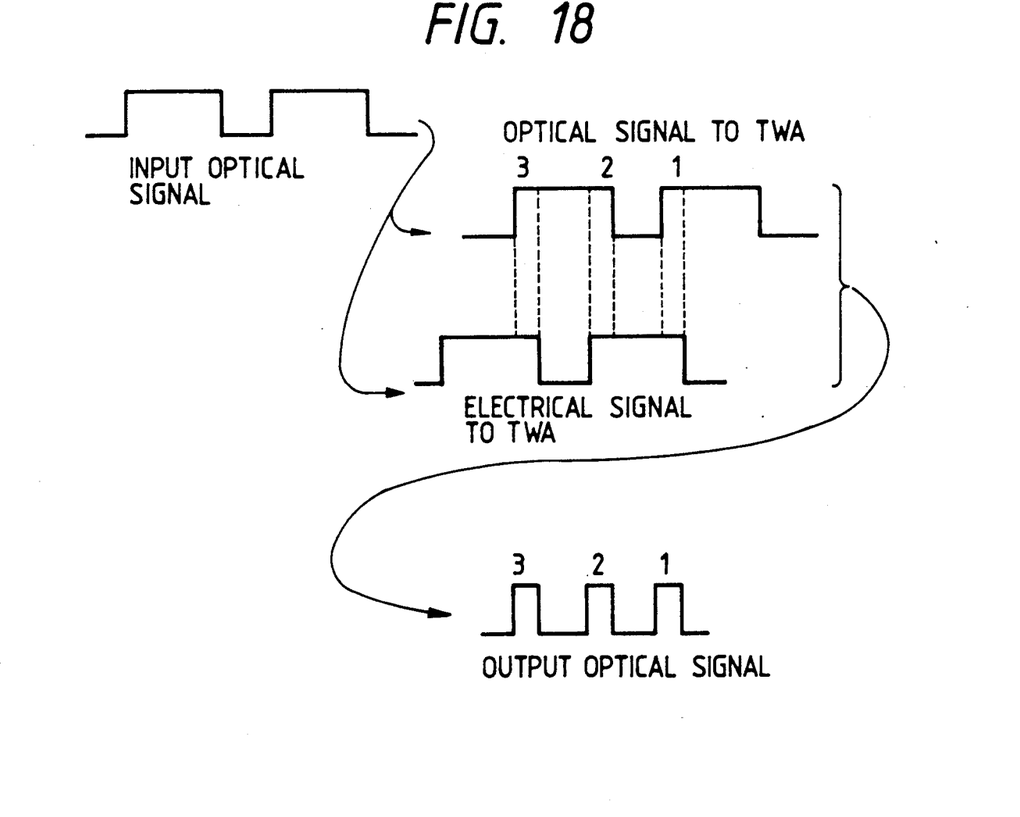
FIGS. 18 and 19 are diagrams illustrating two examples of the operation of the apparatus according to the fifth embodiment.

When one looks at the duration of time for which an optical signal lasts, another advantage of the fifth embodiment will become apparent in the case where optical signals are supplied successively to the TWA 50. That is, a subsequent optical pulse signal can be effectively used to produce a processed (code converted) output optical pulse signal as shown in FIG. 18.

Figure 19:
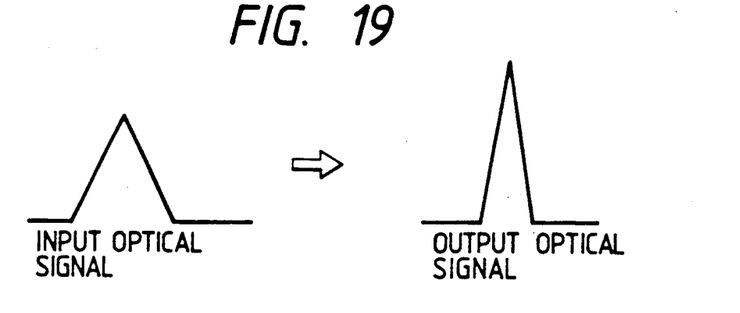

The fifth embodiment has yet another advantage; as shown in FIG. 19, an amplified output of a shorter pulse width can be produced if its duration is within the response time of each of the photoelectric converter 22 and TWA 50.

Figure 20:
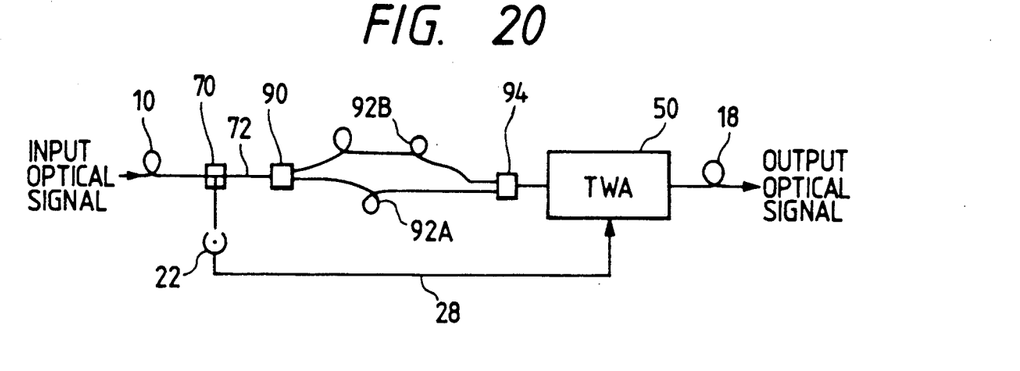
FIG. 20 is a block diagram showing the composition of a light waveform shaping apparatus according to a sixth embodiment of the present invention.

A sixth embodiment of the present invention is next described in greater detail with reference to FIG. 20. This embodiment is essentially the same as the first embodiment, except that an optical switch 90, a zero-delay optical path 92A, an optical path 92B that provides a delay of the type described in connection with the fourth embodiment, and an optical combiner 94 are inserted in the input optical path 26. The optical switch 90 is capable of selection between two modes, one for processing an optical signal and the other for performing no such processing.

A current amplifier 29 (FIG. 1) may be inserted between the photoelectric converter 22 and the TWA 50 so as to enhance the amplification factor.

Figure 21:
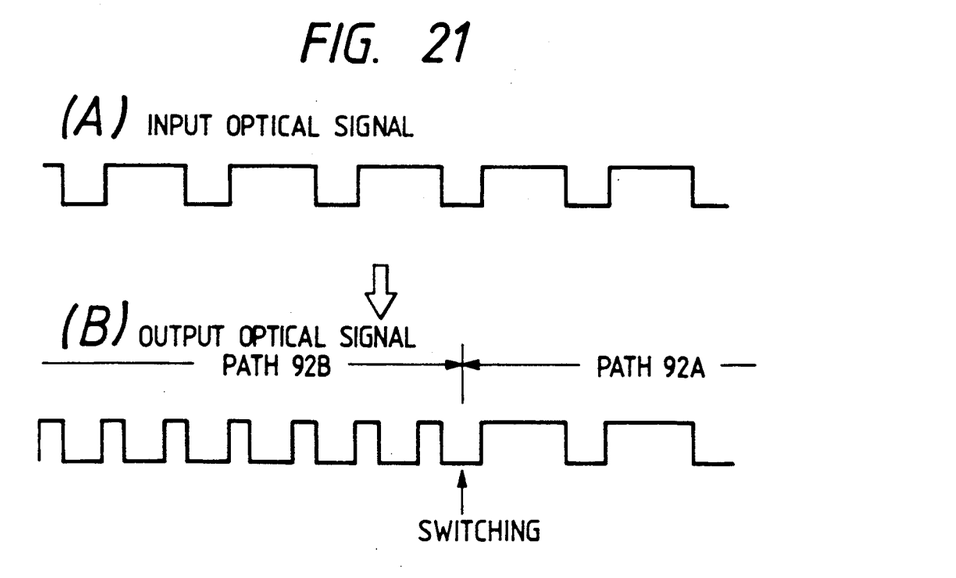
FIG. 21 is a diagram illustrating the operation of the apparatus according to the sixth embodiment.

If an input optical signal of the waveform shown in FIG. 21(A) is supplied to the TWA 50 in the sixth embodiment, a high-frequency optical output of a short signal duration [the first seven pulses shown in FIG. 21(B)], is produced when the optical path 92B is selected by the optical switch 90. If the switch 90 is thereafter shifted to select the optical path 92A, a low-frequency optical output of a long signal duration [the last two pulses shown in FIG. 21(B) and identical to the input waveform] will be produced. Therefore, the waveform and frequency of an optical output can be changed by operating the mode selecting optical switch 90.

What is claimed is:

1. A light waveform changing apparatus, comprising:
   beam splitting means for branching an input optical signal into a first and second optical signal;
   photoelectric converting means for converting said first optical signal into an electrical signal;
   an optical amplifier whose gain is adjustable by a controlling optical signal for amplifying said second optical signal;
   an input optical path for introducing said second optical signal to said optical amplifier; and
   means for converting said electrical signal outputted from said photoelectric converting means into an optical signal and introducing said optical signal into said optical amplifier as said controlling optical signal; wherein
   said second optical signal and said controlling optical signal are supplied to said optical amplifier at a predetermined timing of generally coincident arrival.

2. A light waveform changing apparatus as claimed in claim 1, further comprising means for supplying a bias current to said optical amplifier.

3. A light waveform changing apparatus as claimed in claim 1, wherein said electrical circuit comprises a current amplifier for amplifying said electrical signal outputted from said photoelectric converting means.

4. A light waveform changing apparatus as claimed in claim 1, wherein said optical amplifier is a traveling-wave type optical amplifier comprising a semiconductor laser and an anti-reflection film which is coated on each of end faces of said semiconductor laser.

5. A light waveform changing apparatus as claimed in claim 1, wherein said beam splitting means is a fiber beam splitter.

6. A light waveform changing apparatus as claimed in claim 1, wherein said electrical circuit comprises an electrical waveform shaping circuit.

7. A light waveform changing apparatus as claimed in claim 1, wherein a plurality of said light waveform shaping apparatus are connected in series.

8. A light waveform changing apparatus, comprising:
   beam splitting means for branching an input optical signal into first and second optical signals;
   photoelectric converting means for converting said first optical signal into an electrical signal;

an optical amplifier whose gain is adjustable by a controlling signal for amplifying said second optical signal;

an input optical path for introducing said second optical signal to said optical amplifier;

an electrical circuit for introducing said electrical signal outputted from said photoelectric converting means to said optical amplifier as said controlling signal; and a delay unit disposed in said input optical path for providing a relative quantity of delay between arrival times at the optical amplifier of said second optical signal and said controlling signal.

9. A light waveform changing apparatus as claimed in claim 8, wherein said relative quantity of delay is made variable.

10. A light waveform changing apparatus as claimed in claim 8, further comprising means for supplying a bias current to said optical amplifier.

11. A light waveform changing apparatus as claimed in claim 8, wherein said electrical circuit comprises a current amplifier for amplifying said electrical signal outputted from said photoelectric converting means.

12. A light waveform changing apparatus as claimed in claim 8, wherein said beam splitting means is a fiber beam splitter.

13. A light waveform changing apparatus as claimed in claim 8, wherein said electrical circuit comprises an electrical waveform shaping circuit.

14. A light waveform changing apparatus as claimed in claim 8, wherein a plurality of said light waveform shaping apparatus are connected in series.

15. A light waveform changing apparatus as claimed in claim 8, wherein said optical amplifier is a traveling-wave type optical amplifier comprising a semiconductor laser and an anti-reflection film which is coated on each end face of said semiconductor laser.

16. A light waveform changing apparatus, comprising:

beam splitting means for branching an input optical signal into a first and second optical signal;

photoelectric converting means for converting said first optical signal into an electrical signal;

an optical amplifier whose gain is adjustable by a controlling signal for amplifying said second optical signal;

an input optical path for introducing said second optical signal to said optical amplifier;

an electrical circuit for introducing said electrical signal outputted from said photoelectric converting means to said optical amplifier as said controlling signal; and a delay unit disposed in said electrical circuit for providing a relative quantity of delay between arrival times at the optical amplifier of said second optical signal and said controlling signal.

17. A light waveform changing apparatus as claimed in claim 16, wherein said relative quantity of delay is made variable.

18. A light waveform changing apparatus as claimed in claim 16, further comprising means for supplying a bias current to said optical amplifier.

19. A light waveform changing apparatus as claimed in claim 16, wherein said electrical circuit comprises a current amplifier for amplifying said electrical signal outputted from said photoelectric converting means.

20. A light waveform changing apparatus as claimed in claim 16, wherein said beam splitting means is a fiber beam splitter.

21. A light waveform changing apparatus as claimed in claim 16, wherein said electrical circuit comprises an electrical waveform shaping circuit.

22. A light waveform changing apparatus as claimed in claim 16, wherein a plurality of said light waveform shaping apparatus are connected in series.

23. A light waveform changing apparatus as claimed in claim 16, wherein said optical amplifier is a traveling-wave type optical amplifier comprising a semiconductor laser and an anti-reflection film which is coated on each end face of said semiconductor laser.

* * * * *